WAVE TRANSMISSION NETWORK

Filed Oct. 29, 1952 7 Sheets-Sheet 1

INVENTORS
FRANK A. HESTER
HUGH C. RESSLER
BY Jacob B. Burke
ATTORNEY

INVENTORS
FRANK A. HESTER
HUGH C. RESSLER
BY Jacob B. Burke
ATTORNEY

NETWORK NUMBER 3

$L_1 = \frac{2048}{693\pi^2}$, $L_2 = \frac{2048}{945\pi^2}$, $L_3 = \frac{1024}{525\pi^2}$ HENRIES

F = FARADS

INVENTORS
FRANK A. HESTER
HUGH C. RESSLER

BY Jacob B. Burke

ATTORNEY

Aug. 21, 1956 F. A. HESTER ET AL 2,760,167

WAVE TRANSMISSION NETWORK

Filed Oct. 29, 1952 7 Sheets-Sheet 4

INVENTORS
FRANK A. HESTER
HUGH C. RESSLER
BY Jacob B. Burke
ATTORNEY

INVENTORS
FRANK A. HESTER
HUGH C. RESSLER
BY Jacob B. Burke
ATTORNEY

INVENTORS
FRANK A. HESTER
HUGH C. RESSLER
BY Jacob B. Burke
ATTORNEY

INVENTORS
FRANK A. HESTER
HUGH C. RESSLER
BY Jacob B. Burke
ATTORNEY

United States Patent Office 2,760,167
Patented Aug. 21, 1956

2,760,167

WAVE TRANSMISSION NETWORK

Frank A. Hester, New York, and Hugh C. Ressler, Bayside, N. Y., assignors to Hogan Laboratories, Inc., New York, N. Y., a corporation of New York

Application October 29, 1952, Serial No. 317,392

14 Claims. (Cl. 333—70)

This invention relates to electrical circuits and particularly concerns networks used as filters, time delay transmission means, and the like.

It is an object of the invention to provide a novel wave transmission network for use in communication apparatus.

It is another object of the present invention to provide a novel electrical filter for use in television, facsimile, telephone, telegraph, and other communication systems.

It is a further object to provide a novel four-terminal electrical network composed of passive, non-dissipative elements, for electrical filtering purposes.

It is a further object to provide an insertion loss filter of non-iterative type having substantially linear phase characteristics.

It is a further object to provide an insertion loss filter of non-iterative type having substantially linear phase and prescribed amplitude characteristics.

Other and further objects of the invention will become apparent from the following description taken together with the drawings, wherein.

Electric wave filters have two important response characteristics which together determine the suitability of a given filter for a particular application. These two characteristics are, respectively, the amplitude and phase responses of the network to varying frequency. In such a filter departure from an amplitude characteristic, in which there is equal amplitude response to all frequencies, indicates that the output wave form of the electric wave filter will not in general be a duplicate of the input wave form but will be distorted. Similarly, departure of the phase characteristic of the filter from a linear relationship indicates that the output wave form will be further distorted.

In many applications electric wave filters are employed to restrict the spectrum of an outgoing signal or to separate wanted portions from unwanted portions of incoming signals. In such cases the amplitude characteristic of the filter is chosen to fit the selectivity requirements. This attenuation characteristic introduces a minimum wave form distortion for the filter. The wave form distortion realized can be reduced to this minimum only if the phase characteristic is linear with regard to frequency.

The combined effects of amplitude and phase distortion are reflected in the transient response of the filter. For a given amplitude response a filter having poor phase response will have an excessive ringing transient response characteristic. If the phase is linear, the transient response characteristic will be symmetrical, and the ringing will be minimized.

Figure 1:
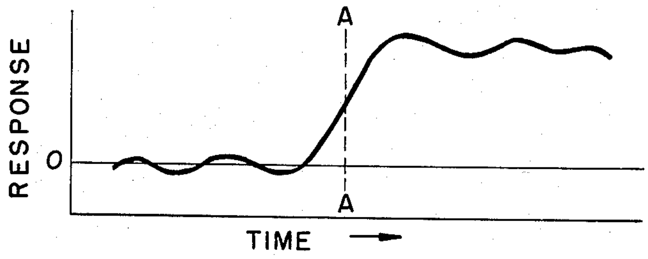
Fig. 1 shows the transient response curve of an ideal low-pass filter.
Figure 2:
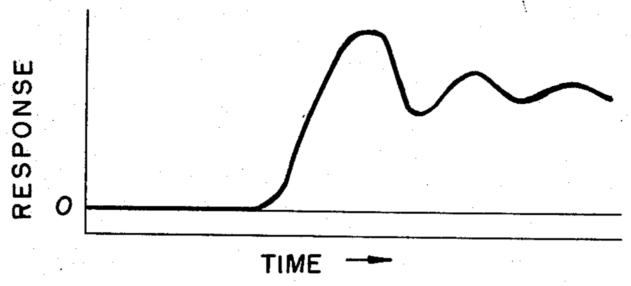
Fig. 2 shows the transient response curve of a low-pass filter.

An ideal low-pass filter is one in which the amplitude response characteristic is uniform for all frequencies below a given cutoff frequency and zero for all frequencies above a given cutoff frequency. The phase characteristic of the ideal filter is a straight line characteristic with frequency for all frequencies below the given cutoff frequency and arbitrary for all frequencies above the cutoff frequency. The transient response of such a filter can be predicted and is illustrated graphically in Fig. 1. This response exhibits a symmetry about some arbitrary ordinate A—A which is characteristic of linear phase filters. For comparison, Fig. 2 illustrates the type of transient response exhibited by a low-pass filter in which the phase is not linear and in which no symmetry exists.

The design of a filter having a given amplitude response and a linear phase characteristic is a difficult problem. In the past extremely complicated structures have been necessary to achieve an adequately linear phase characteristic with a given amplitude characteristic. In one type of filter a design is made for an amplitude characteristic employing the Zobel type constant K and M-derived, iterative impedance sections. Then sections having phase correcting characteristics are added until the desired phase linearity is attained. In another type of design the filter is based upon the Bode iterative impedance section as disclosed in Patent No. 1,828,454. In either case, to obtain adequate results, particularly at frequencies near the cutoff frequency or in the cutoff region of such filters, it is necessary to produce rather complicated structures due, in part, to the fact that the iterative impedance formulae give acceptable results only when the number of sections is unduly large.

*Analysis and synthesis of a wave filter*

It is desirable in the design of a filter to be able to produce a phase response which is linear within limits over a specified range of frequencies and to be able to select a specified amplitude response characteristic independent of the phase response within limits over this same range of frequencies. Such a design must be based upon the actual amplitude and phase responses obtained and yield structures involving the minimum number of elements required.

The actual response of a circuit may be found by analysis. Any four-terminal network having input terminals 1 and output terminals 2 and made up of passive, non-dissipative, interconnected elements, can be connected to appropriate load and input resistors as $R_2$ and $R_1$ in Fig. 3, and R of Fig. 4 and analyzed mathematically for its respose characteristic as a function of frequency. This response may be designated as $E_2/E_1$ (Fig. 3), or $E_2/I_1$ (Fig. 4) wherein $E_1$ and $E_2$ are input and output voltages respectively, and $I_1$ is input current. If the four-terminal network contains a finite number of elements, the response characteristic will be a rational function of $\omega$, the angular frequency wherein $\omega=2\pi f$, and will include, in general, a real and an imaginary part. The real part and the imaginary part will each be rational functions of $\omega$. As a consequence, it is always possible to express the response in the form:

$$(1) \qquad \frac{j\omega A(\omega)}{B(\omega)+j\omega C(\omega)}$$

or, $$\frac{A(\omega)}{B(\omega)+j\omega C(\omega)} \tag{2}$$

where $A(\omega)$, $B(\omega)$ and $C(\omega)$ are even polynomials in $\omega$. If we make the substitution $$\lambda=j\omega \tag{3}$$

then the response may be written $$\frac{P_1(\lambda)}{P_2(\lambda)+P_3(\lambda)} \tag{4}$$

where $P_1(\lambda)$ is either an even or an odd polynomial in $\lambda$ and $P_2(\lambda)$ and $P_3(\lambda)$ are respectively even and odd. Thus the physically obtainable response characteristics for all networks employing a finite number of passive non-dissipative elements are of the Form 4. The coefficients of the various powers of $\lambda$ in the polynomials will be functions of the element values included in the network under analysis, and the degree of each polynomial will, in general, be a function of the number of elements employed in the network under analysis. The structure under analysis is a minimum element structure if, and only if, the number of elements in the structure is the same as the number of independent polynomial coefficients in Expression 4. This must be true, for if there are more components in the network than this number, more than one set of element values may be assigned to them which will yield the same values for the polynomial coefficients and there cannot be less than this number, for each component contributes at most a linear or an inverse factor in $\lambda$. Thus a minimum element structure, when analyzed, will yield a response characteristic of the Form 4, in which the number of independent polynomial coefficients is equal to the number of elements in the structure. This implies that a change in value of any element in the structure will produce a corresponding change in the response characteristic. Similarly, a change in response characteristic will involve a change in at least one element value. If a set of admissible polynomials written in the Form 4 yields a desirable response characteristic, it is possible to determine the element values of a minimum element network which will have this response by equating polynomial coefficients resulting from the analysis of the network to the coefficients of the admissible polynomials and solving a set of simultaneous equations. This procedure, then, will yield a minimum element network having the desired admissible response characteristic. Other procedures may be employed to synthesize a minimum element network having a response characteristic given by admissible polynomials in the Form 4. It is of particular interest, especially in instances in which the networks are to be used in conjunction with electronic apparatus, in which cases they may be called upon to act as interstage coupling networks between vacuum tubes and the like, to synthesize networks for use in the configuration of Fig. 4, in which one end of the network is terminated in a resistor and the opposite end of the network is not so terminated. An analysis of Fig. 4 yields the equation:

$$\frac{E_2}{I_1}=\frac{z_{12}}{1+z_{22}} \tag{5}$$

where $z_{12}$ is the open circuit driving point transfer impedance of the network and $z_{22}$ is the open circuit driving point impedance of the network viewed from terminals 2. In addition, the impedances have been normalized by setting R to be equal to 1 ohm. If $P_1(\lambda)$ and $P_3(\lambda)$ in Form 4 are odd and $P_2(\lambda)$ is even, we find:

$$z_{12}=\frac{P_1(\lambda)}{P_2(\lambda)};\quad z_{22}=\frac{P_3(\lambda)}{P_2(\lambda)} \tag{6}$$

Similarly, if $P_1(\lambda)$ is even, we have $$z_{12}=\frac{P_1(\lambda)}{P_3(\lambda)};\quad z_{22}=\frac{P_2(\lambda)}{P_3(\lambda)} \tag{7}$$

With the aid of Equations 6 and 7 it is possible to synthesize a minimum element network having the required characteristics by synthesizing a network having a terminal impedance $z_{22}$ and introducing frequencies of infinite attenuation corresponding to the roots of $z_{12}$. It will be noted that these roots may occur at real, imaginary, or complex frequencies in accordance with the roots of the polynomial $P_1(\omega)$.

Figure 3:
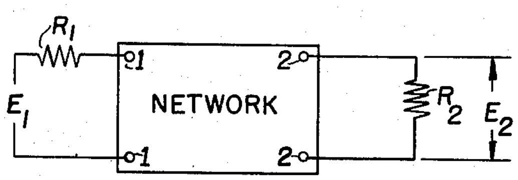
Figs. 3 and 4 show schematically four-terminal networks connected to appropriate load and input resistors.
Figure 4:
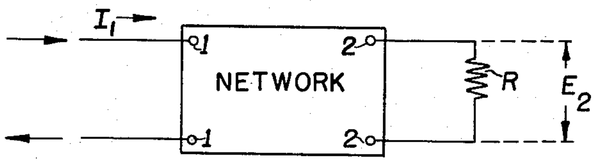

If suitable polynomials are chosen for $P_1(\lambda)$, $P_2(\lambda)$ and $P_3(\lambda)$, a network can be synthesized in either the configuration of Fig. 3 or the configuration of Fig. 4 having the desired response. The amplitude response of the network will be given by $$A(\omega)=\frac{|P_1(\omega)|}{\sqrt{[P_2(\omega)]^2=[P_3(\omega)]^2}} \tag{8}$$

and the phase response will be given by $$\theta=\arctan\frac{P_3(\omega)}{P_2(\omega)}+\Delta\frac{\pi}{2} \tag{9}$$

where $\Delta$ is 0 when $P_1(\omega)$ is even, and $\Delta$ is 1 when $P_1(\omega)$ is odd. Now the slope of the phase characteristic, the envelope time delay, $\tau$ is found by differentiating Equation 9 and is given by $$\tau=\frac{P_2(\omega)\frac{dP_3(\omega)}{d\omega}-P_3(\omega)\frac{dP_2(\omega)}{d\omega}}{[P_2(\omega)]^2+[P_3(\omega)]^2} \tag{10}$$

*The trigonometric polynomials*

From Equations 8, 9 and 10 it is apparent that the phase and time delay characteristics of the network are functions only of the polynomials $P_2(\omega)$ and $P_3(\omega)$, while the amplitude characteristic is a function of all three polynomials. Thus some degree of independent control of amplitude and phase characteristics is indicated.

If the restriction limiting $P_1(\omega)$, $P_2(\omega)$ and $P_3(\omega)$ to polynomial form is lifted (admitting the possibility of a network infinite in extent), the response of the ideal filter can be determined and studied. If $P_2(\omega)$ is replaced by $\cos\omega$ and $P_3(\omega)$ is replaced by $\sin\omega$, Equations 8, 9 and 10 become:

$$A(\omega)=P_1(\omega) \tag{11}$$

$$\theta=\omega \tag{12}$$

$$\tau=1 \tag{13}$$

where $P_1(\omega)$ is now an arbitrary function, either even or odd. Thus with a network which is infinite in extent theory indicates that any desired amplitude response together with perfectly linear phase and constant time delay may be had.

As a first attempt at approximating the response of the ideal filter, consider the use of the following even and odd polynomials $$C_n(\omega)=\left(1-\frac{4\omega^2}{\pi^2}\right)\left(1-\frac{4\omega^2}{9\pi^2}\right)\left(1-\frac{4\omega^2}{25\pi^2}\right)\cdots\left(1-\frac{4\omega^2}{\overline{2n-1}^2\pi^2}\right) \tag{14}$$

$$S_n(\omega)=\omega\left(1-\frac{\omega^2}{\pi^2}\right)\left(1-\frac{\omega^2}{4\pi^2}\right)\left(1-\frac{\omega^2}{9\pi^2}\right)\cdots\left(1-\frac{\omega^2}{n^2\omega^2}\right) \tag{15}$$

These are the trigonometric polynomials of degree $2n$ and $2n+1$. The polynomial $C_n(\omega)$ is one whose roots coincide with the first $n$ positive and negative roots of $\cos\omega$ and as $n$ becomes large, approaches closely the function $\cos\omega$. Similarly $S_n(\omega)$ is a polynomial with a root at zero whose non-zero roots coincide with the first $n$ positive and negative non-zero roots of $\sin\omega$. As $n$ becomes large, $S_n(\omega)$ approaches $\sin\omega$.

If these polynomials having uniformly spaced roots are employed as $P_2(\omega)$ and $P_3(\omega)$, the corresponding open circuit driving point impedance being given by the ratio of these polynomials is seen to have equally spaced resonant and anti-resonant frequencies, the amplitude, phase, and time delay characteristics become

(16) $$A(\omega)=\frac{|P_1(\omega)|}{\sqrt{[C_n(\omega)]^2+[S_n(\omega)]^2}}$$

(17) $$\theta=\arctan\frac{S_n(\omega)}{C_n(\omega)}+\Delta\frac{\pi}{2}$$

(18) $$\tau=\frac{C_n(\omega)\frac{dS_n(\omega)}{d\omega}-S_n(\omega)\frac{dC_n(\omega)}{d\omega}}{[S_n(\omega)]^2+[C_n(\omega)]^2}$$

Thus the amplitude response becomes the ratio of two functions, the numerator being an arbitrary polynomial either even or odd of degree not greater than $2n+1$, while the denominator becomes a fixed function of $\omega$ for a given value of $n$. The phase function will approximate a straight line, particularly for values of $\omega$ in which $$\omega^2<<n^2\pi^2$$

Figure 5:
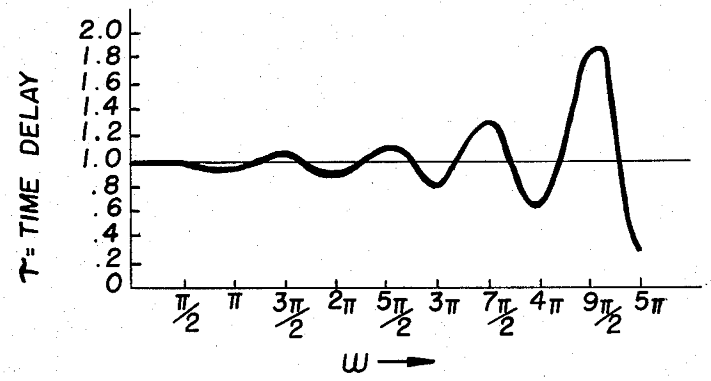
Figs. 5, 6, 7, 10, 11, 12, 13, 17 show characteristic curves employed in explaining the invention.

In fact, the phase characteristic tends to oscillate about a straight line with ever-increasing amplitude, crossing the straight line at each root of $S_n(\omega)$ and each root of $C_n(\omega)$. Similarly, the time delay characteristic is very nearly unity for $\omega^2<<n^2\pi^2$ and oscillates about the value 1 with ever-increasing amplitude as $\omega$ increases. For $\omega^2<n^2\pi^2$ the maxima and minima of the delay characteristic very nearly coincide with the roots of $S_n(\omega)$ $C_n(\omega)$. A typical time delay characteristic is plotted in Fig. 5.

*Perturbation of the trigonometric polynomials*

If $K_nS_n(\omega)$ is employed, instead of $S_n(\omega)$ and K is a real constant, the response equations become

(19) $$A(\omega)=\frac{|P_1(\omega)|}{\sqrt{[C_n(\omega)]^2+K_n^2[S_n(\omega)]^2}}$$

(20) $$\theta=\arctan\frac{K_nS_n(\omega)}{C_n(\omega)}+\Delta\frac{\pi}{2}$$

(21) $$\tau=\frac{K_n\left[C_n(\omega)\frac{dS_n(\omega)}{d\omega}-S_n(\omega)\frac{dC_n(\omega)}{d\omega}\right]}{K_n^2[S_n(\omega)]^2+[C_n(\omega)]^2}$$

Figure 6:
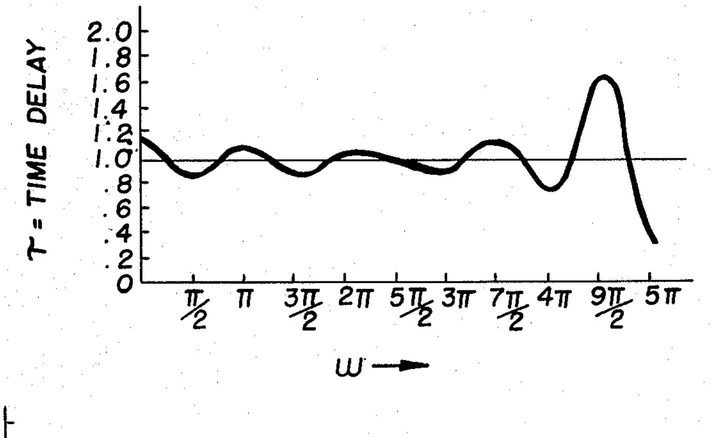

The amplitude response is altered by the introduction of K in such a manner that the response at the roots of $C_n(\omega)$ is inversely proportional to K, while the response at the roots of $S_n(\omega)$ is independent of K. The time delay characteristic is influenced by the introduction of K in such a way that the delay at the roots of $C_n(\omega)$ is inversely proportional to K, while the delay at the roots of $S_n(\omega)$ is proportional to K. Thus the ripple in the delay characteristic and in the amplitude characteristic may be perturbed through the introduction of the parameter K. It is possible to choose K so as to make the delay characteristic unity at any selected root of $S_n(\omega)$ or $C_n(\omega)$. If this is done, an especially constant delay characteristic and an especially linear phase characteristic will be obtained for values of $\omega$ near the selected root. K may also be employed as a compromise parameter between amplitude and phase response. A typical resultant time delay characteristic for such an appropriate choice of K is plotted in Fig. 6.

A greatly improved phase and delay response over a region may be obtained by varying the highest frequency root of the polynomial of highest degree. For example, if $$C_n(\omega) \text{ and } S^r_n(\omega)$$

are employed as the polynomials where

(22) $$S_n{}^r(\omega)=S_{(n-1)}(\omega)\left[1-\frac{\omega^2}{r^2\pi^2}\right]$$

The parameter $r$ may be varied and assigned the value which will optimize the phase and delay characteristic over this range of frequencies at the expense of the characteristic outside this range. Similarly $$S_n(\omega) \text{ and } C^r_{n+1}(\omega)$$

may be employed where

(23) $$C^r_{n+1}(\omega)=C_n(\omega)\left[1-\frac{\omega^2}{r^2\pi^2}\right]$$

The appropriate value of $r$ for minimizing the ripple in the delay characteristic between the limits $\omega_1$ and $\omega_2$ may be found by solving the following equation for $r$

(24) $$\int_{\omega_1}^{\omega_2}\frac{d}{dr}[\tau(\omega,r)-1]^2d\omega=0$$

This becomes

(25) $$\int_{\omega_1}^{\omega_2}[\tau(\omega,r)-1]\frac{d\tau(\omega,r)}{dr}d\omega=0$$

Figure 7:
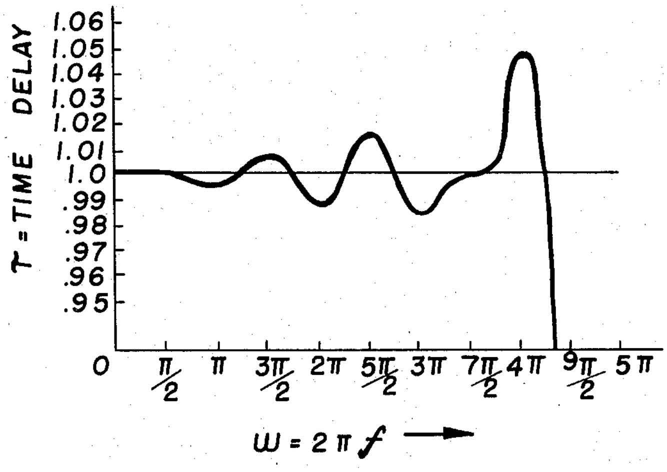

For most problems it is sufficiently accurate to evaluate the integrals in either Equation 24 or Equation 25 by summing the values of the integrand for the values of $\omega$ which correspond to the roots of the polynomials employed that lie in the range $\omega_1$ to $\omega_2$. Fig. 7 illustrates a typical time delay characteristic to be obtained when $$C_n(\omega) \text{ and } S^r_n(\omega)$$

are employed with the value of $r$ chosen to minimize the ripple in the delay characteristic over a frequency range.

A further reduction in ripple in the delay characteristic over a frequency range can be obtained by varying two parameters when $$C^r_{n+1}(\omega) \text{ and } S^r_n2(\omega)$$

are employed as the polynomials. The improvement in the delay characteristic, however, is quite small and will generally be found unnecessary, inasmuch as, in general, the delay characteristic over a frequency range can be made so excellent by varying the single parameter $r$ that inaccuracies in the circuit elements when the final filter is built will produce sufficient ripple in the delay characteristic to overshadow the ripple which would be present if ideally accurate components were employed.

*Basic linear phase networks*

It is of importance to note that a complete family of basic linear phase networks is defined by the polynomials $S_n(\omega)$ and $C_n(\omega)$ subject to perturbation through the parameters K and $r$. It is convenient to assign numbers to these basic networks. The number $n$ may be associated with the network defined by the polynomials $S_n(\omega)$ and $C_n(\omega)$, while the number $n+\frac{1}{2}$ may be associated with the network defined by the use of the polynomials $S_n(\omega)$ and $C_{n+1}(\omega)$. In these basic networks the polynomal $P_1(\lambda)$ is chosen to be unity. Then the response of the basic network becomes a measure of possible responses for a given degree of complexity; i. e., the delay characteristic may be perturbed by the parameters K and $r$ without adding to the complexity, while the amplitude response (also perturbed by the parameters K and $r$) may be multiplied by a polynomial $P_1(\omega)$, which is either even or odd, and whose degree does not exceed that of the polynomial of highest degree of the family $S_n(\omega)$, $C_n(\omega)$ employed. When the polynomial $P_1(\omega)$ is introduced, one new element will be introduced into the structure for each new independent polynomial coefficient introduced by $P_1(\omega)$.

The simplest of these basic networks is the one corresponding to the number ½. Its response is given by the expression

(26) $$\frac{1}{C_1(\omega)+jS_0(\omega)}=\frac{1}{1-\frac{4\omega^2}{\pi^2}+j\omega}$$

Figure 8A:
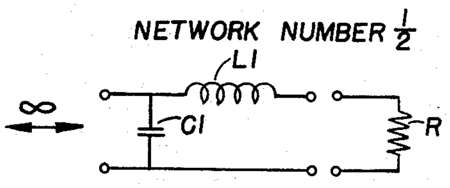
Figs. 8A, 9A, 14A, 15A and 16A are typical circuit configurations embodying the invention.
Figure 8B:
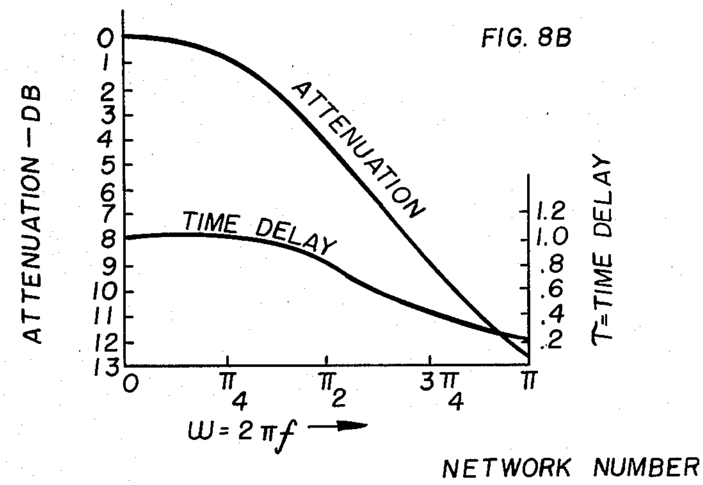
Figs. 8B, 9B, 14B, 15B, 16B are characteristic curves of the circuit configurations of Figs. 8A, 9A, 14A, 15A and 16A respectively.

Its response curves together with a typical configuration are shown in Figs. 8B and 8A respectively. The values of elements shown in Fig. 8A are as follows:

$$L=\frac{4}{\pi^2}\text{ henry}$$

$$C=1\text{ farad}$$

$$R=1\text{ ohm}$$

The response for basic networks No. 1, 1½, 2, 2½ and 3 are given respectively in the following relations:

$$(27)\qquad \frac{1}{C_1(\omega)+jS_1(\omega)}$$

$$(28)\qquad \frac{1}{C_2(\omega)+jS_1(\omega)}$$

$$(29)\qquad \frac{1}{C_2(\omega)+jS_2(\omega)}$$

$$(30)\qquad \frac{1}{C_3(\omega)+jS_2(\omega)}$$

$$(31)\qquad \frac{1}{C_3(\omega)+jS_3(\omega)}$$

Figure 9A:
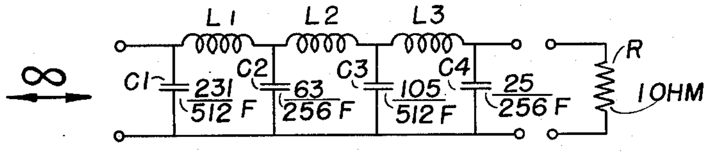
Figure 9B:
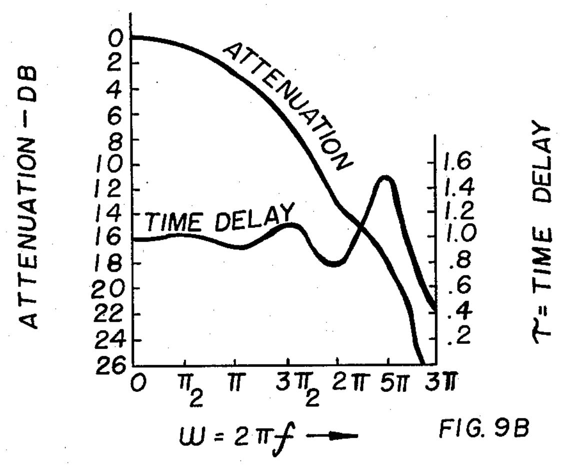

The responses together with a typical configuration for network number 3 are shown in Figs. 9B and 9A respectively. The values of elements shown in Fig. 9A are as follows:

$$C_1=\frac{231}{512}\text{ farads}$$

$$C_2=\frac{63}{256}\text{ farads}$$

$$C_3=\frac{105}{512}\text{ farads}$$

$$C_4=\frac{25}{256}\text{ farads}$$

$$L_1=\frac{2048}{693\pi^2}\text{ henries}$$

$$L_2=\frac{2048}{945\pi^2}\text{ henries}$$

$$L_3=\frac{1024}{525\pi^2}\text{ henries}$$

$$R=1\text{ ohm}$$

Similar figures can be drawn for the basic networks of any other numbers.

*Final linear phase networks*

Final filters may be designed by combining as many basic filters (perturbed if desired by K and $r$) as is required and choosing the polynomials $P_1(\omega)$ to give the desired amplitude response.

When basic filters are combined, the combined response is, of course, the product of the individual basic responses. Thus the combined response of basic filter N and basic filter M is given by $$(32)\qquad \frac{1}{C_N(\omega)+jS_N(\omega)}\cdot\frac{1}{C_M(\omega)+jS_M(\omega)}=\frac{1}{C_M(\omega)C_N(\omega)-S_M(\omega)S_N(\omega)+j[S_M(\omega)C_N(\omega)+S_N(\omega)C_M(\omega)]}$$

This combination produces a structure which is of the same complexity as basic structure N+M+½ but yields a response which is different.

The basic filters above mentioned have a basic amplitude response which is the reciprocal of the function $D_n(\omega)$, defined by $$(33)\qquad D_n(\omega)=\sqrt{[C_n(\omega)]^2+[S_n(\omega)]^2}$$

Figure 10:
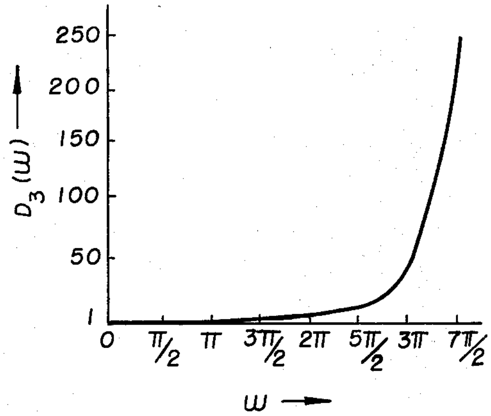

$D_n(\omega)$ is of course modified appropriately by the parameters K and $r$ if they are introduced. For small values of $\omega$, $D_n(\omega)$ approaches unity. As $\omega$ increases, $D_n(\omega)$ increases. For values of $\omega$ greater than the values corresponding to the roots of the functions $C_n(\omega)$ and $S_n(\omega)$, $D_n(\omega)$ increases very rapidly. A typical plot of the function $D_n(\omega)$ is shown in Fig. 10, with $n=3$. It is this function which must be taken into account when choosing the polynomial $P_1(\omega)$ to give a desired amplitude response.

Conventionally, amplitude responses are required to give low-pass, band-pass, and high-pass characteristics, but other types of responses are required to meet special problems. For example, a response which is linear with frequency may be required in a frequency modulation discriminator design. An amplitude response which is flat everywhere, the all-pass network, may be required in an application involving time delay.

Regardless of what the required type of response may be (as long as it does not violate the law of conservation of energy), it may be approximated as closely as required in a structure of sufficient complexity, i. e., if the number corresponding to the basic filter employed is sufficiently high.

If $P_1(\omega)$ is even, let it be represented by $$(34)\qquad P_1(\omega)=A_0+A_2\omega^2+A_4\omega^4+\ .\ .\ .\ A_{2i}\omega^{2i}$$

If $P_1(\omega)$ is odd, let it be represented by $$(35)\qquad P_1(\omega)=A_1\omega+A_3\omega^3+A_5\omega^5\ .\ .\ .\ A_{2i+1}\omega^{2i+1}$$

Then the coefficients of $P_1(\omega)$ may be evaluated by forming the set of simultaneous equations $$(36)\qquad \int_{\omega_1}^{\omega_2}\frac{d}{dA_s}\left[\frac{P_1(\omega)}{D_n(\omega)}-f(\omega)\right]^2 d\omega=0$$

in which $f(\omega)$ is the desired response over the frequency range between $\omega_1$ and $\omega_2$, and solving the equations for the several values of $A_s$.

*The low-pass linear phase network*

In the low-pass structure a response may be required in which the amplitude response is to be essentially flat from zero frequency to the cutoff frequency. Above the cutoff frequency attenuation is required. It may further be required that the delay be constant within limits for all frequencies below the cutoff frequency and arbitrary for all frequencies above. On the other hand, it may be required that the delay be essentially constant over a frequency range extending from zero frequency to some point beyond the cutoff frequency so as to preserve uniform delay through the cutoff region. In the former case the procedure will involve the selection of a basic filter which provides the necessary degree of constancy so far as time delay is concerned, introduction of the parameter $r$, to minimize the ripple in the delay characteristic, and the selection of an appropriate polynomial $P_1(\omega)$ which in the low-pass case will be an even polynomial. If the basic structure selected be number N, the polynomials $C_N(\omega)$ and $S_N(\omega)$ will each have N positive non-zero roots. Variation of the parameter $r$ will alter the position of the highest frequency root on the frequency scale. This may be done in such a way as to minimize the ripple in the delay characteristic over a region embracing all of the other roots of the functions. It is then possible to determine an even polynomial $P_1(\omega)$ such that the resultant amplitude response will be essentially flat over a frequency range including all of the roots of the polynomials $S_n(\omega)$ and $C_n(\omega)$ except the highest frequency root. The degree of polynomial $P_1(\omega)$ will be the same as the degree of the polynomial $C_{N-1}(\omega)$. Thus the degree of $P_1(\omega)$ will be substantially less than that of $S_N(\omega)$ and attenuation will occur for frequencies sufficiently high. In this case Equation 36 becomes $$(37)\qquad \int_0^{\frac{2N-1}{2}\pi}\frac{d}{dA_s}\left[\frac{P_1(\omega)}{D_N(\omega)}-1\right]^2 d\omega=0$$

It is usually sufficiently accurate to evaluate the integrals in the set of simultaneous equations given by 37 by summing the values of the integrand at values of $\omega$ corresponding to the roots of the polynomials $C_N(\omega)$ and $S_N(\omega)$.

Figure 12:
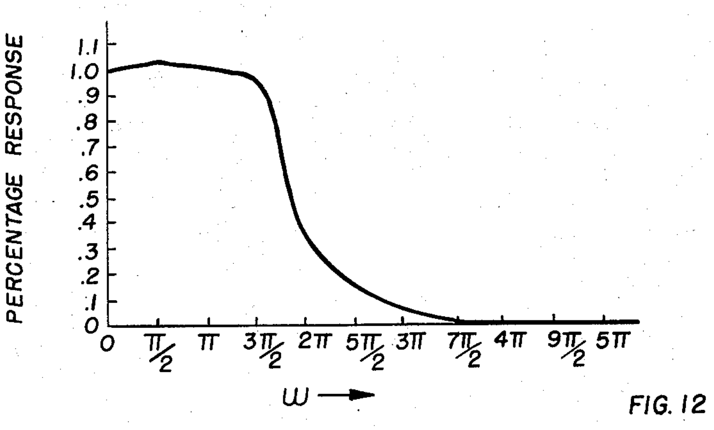
Figure 13:
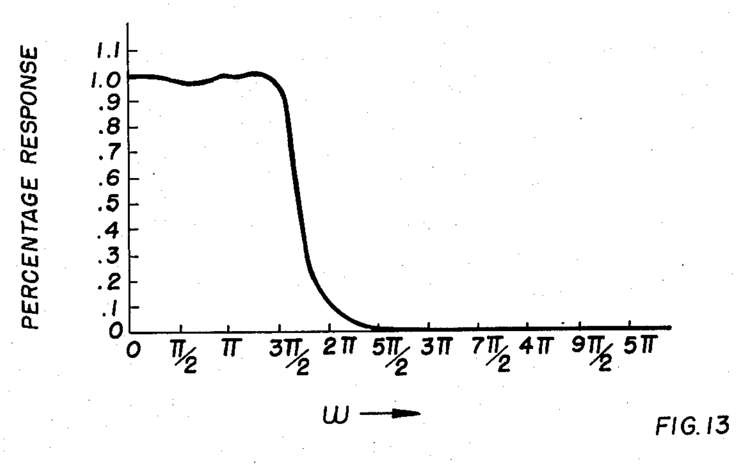
Figure 11:
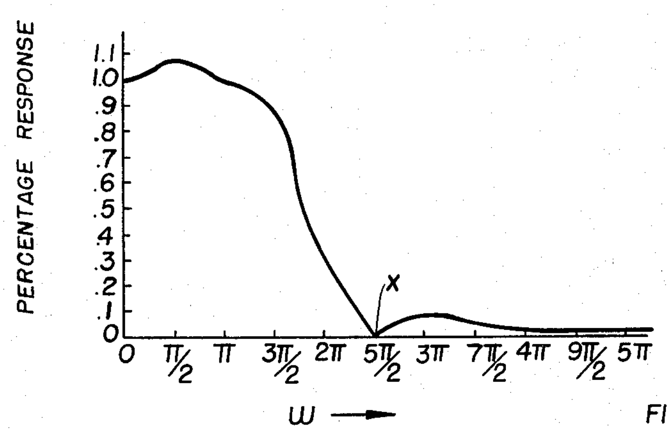

For the case in which it is required that the delay be essentially constant throughout the cutoff region, it is necessary to introduce into $P_1(\omega)$ factors to produce attenuation in the region of linear phase. This may be done most simply by introducing real roots into the polynomial $P_1(\omega)$. It is most convenient, though not necessary, to introduce a real root in the polynomial $P_1(\omega)$ at a frequency corresponding to a root of $C_n(\omega)$ or $S_n(\omega)$. In certain structures the coincidence of these roots may make possible a physical network employing less components. If, as before, a structure of complexity N is employed and the parameter $r$ adjusted for minimum ripple in the delay characteristic over all roots of $S_N(\omega)$ and $C_N(\omega)$ except at highest frequency root, a real root for $P_1(\omega)$ may be selected to coincide with the next to highest frequency root of the set $C_N(\omega)$, $S_N(\omega)$. It is then possible to determine the remainder of $P_1(\omega)$ to produce an amplitude response which is essentially constant over the frequency range from zerc up to and including a frequency corresponding to the root of the set $C_N(\omega)$, $S_N(\omega)$ so high that there is one additional root of the set between the upper frequency limit of essentially constant amplitude response and the frequency at which the real root in $P_1(\omega)$ occurs. The degree of the polynomial $P_1(\omega)$ is unchanged and the remaining coefficients may be evaluated as before from Equation 36. Additional real roots in $P_1(\omega)$ may be introduced, in which case the procedure is essentially the same and the response may be made flat from zero to a frequency corresponding to a root of the set $C_N(\omega)$, $S_N(\omega)$ which is two roots lower in frequency than the lowest frequency real root of $P_1(\omega)$. The introduction of additional real roots in $P_1(\omega)$ is convenient when there are narrow bands of frequency that is desired to eliminate completely. When real roots are introduced in the polynomial $P_1(\omega)$, the phenomenon of "flash-back" occurs as shown in Fig. 11 starting at $x$. If the attenuation in the "flash-back" region is not sufficiently great, an appropriate response may be found by multiplying two appropriate responses such as the response shown in Fig. 11 and the response shown in Fig. 12 which yields the response shown in Fig. 13. In such a case a better result for the remainder of the polynomial $P_1(\omega)$ can be obtained by determining the remaining coefficients from Equation 36 wherein $D_n(\omega)$ may be taken to represent the analogous function obtained when the product response of two basic filters is considered. A product-derived filter produces a steeper cutoff slope and greater attenuation beyond cutoff, due to the fact that the degree of the denominator exceeds the degree of the numerator in response Expression 4 by a greater amount for such a filter.

As an illustration of the design of a low-pass network, consider basic structure number 5. Let the design requirement involve essentially constant time delay through the cutoff region of a low-pass filter and, in addition, exceptional amplitude discrimination against a pair of unwanted frequencies whose frequencies are in the ratio of 7 to 9. A preliminary examination of the problem indicates the use of the polynomials $$C_5(\omega)$$

and $$S_5^r(\omega)$$

and the introduction of a pair of real roots in $P_1(\omega)$ which coincide with the two highest frequency roots of $C_5(\omega)$.

Thus the expression for the response of the network becomes $$\frac{P'_1(\omega)\left(1-\frac{4\omega^2}{49\pi^2}\right)\left(1-\frac{4\omega^2}{81\pi^2}\right)}{C_5(\omega)+jS_5^r(\omega)} \tag{38}$$

where $P'_1(\omega)$ represents the remaining factor in $P_1(\omega)$ yet to be determined.

From Equation 25 it is determined that an appropriate value of $r$ is that for which $$r^2=\frac{6615}{164} \tag{39}$$

An examination of the time delay as given by Equation 18 indicates that for this value of $r$ the delay will be constant within approximately 1% over the frequency range from zero through the cutoff region of the filter. By means of Equation 36 an appropriate value for $P'_1(\omega)$ is found to be $$P'_1(\omega)=1+.209\frac{\omega^2}{\pi^2}+.176\frac{\omega^4}{\pi^4} \tag{40}$$

Thus the response of the required network is given by $$\frac{\left[1+.209\frac{\omega^2}{\pi^2}+.176\frac{\omega^4}{\pi^4}\right]\left(1-\frac{4\omega^2}{49\pi^2}\right)\left(1-\frac{4\omega^2}{81\pi^2}\right)}{C_5(\omega)+jS_4(\omega)\left[1-\frac{164\omega^2}{6615\pi^2}\right]} \tag{41}$$

Figure 14A:
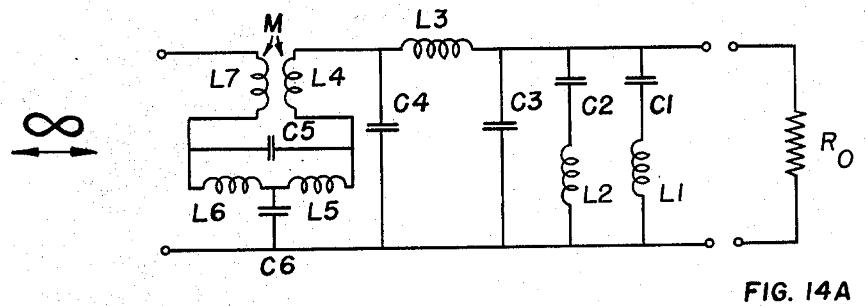
Figure 14B:
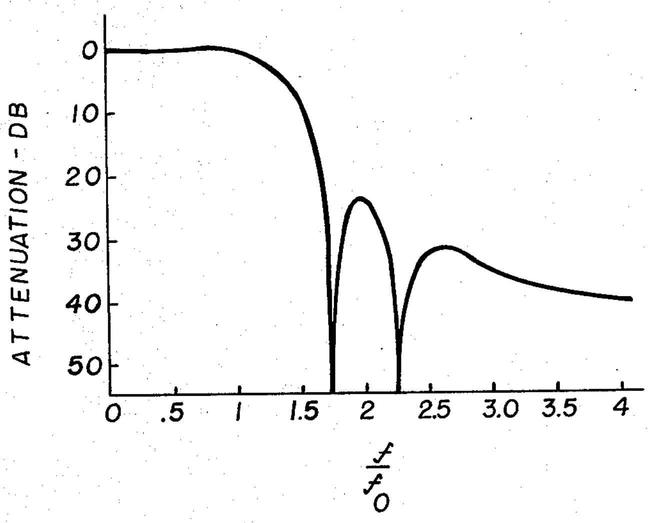

A typical circuit configuration and ampltitude response curve are given in Figs. 14A and 14B respectively. Values for the elements shown in Fig. 14A are as listed below. Values of C are in farads, L and M in henries, R in ohms, and $f$ in cycles per second.

$$C_1=\frac{.0138107}{R_0f_0} \quad L_1=\frac{.362293R_0}{f_0} \quad L_7=\text{Any Value}$$

$$C_2=\frac{.0169004}{R_0f_0} \quad L_2=\frac{.489403R_0}{f_0} \quad M=-\frac{.100411R_0}{f_0}$$

$$C_3=\frac{.0375366}{R_0f_0} \quad L_3=\frac{.167454R_0}{f_0}$$

$$C_4=\frac{.207966}{R_0f_0} \quad L_4=\frac{.0790436R_0}{f_0}$$

$$C_5=\frac{.0860765}{R_0f_0} \quad L_5=\frac{.278800R_0}{f_0}$$

$$C_6=\frac{.723787}{R_0f_0} \quad L_6=\frac{.319502R_0}{f_0}$$

*Polynomial determination employing irrational factoring*

It has been shown that the response of a network is of the form $$\frac{P_1}{P_2+P_3} \tag{42}$$

When the polynomials $P_2$ and $P_3$ are specified, a fundamental filter problem is to determine $P_1$ in such a manner that over a frequency interval $0<\omega<\omega_0$ $$P_1^2\cong P_2^2+P_3^2 \tag{43}$$

A method of determining a polynomial $P_1$ from either $P_2$ or $P_3$ which satisfies condition (43) will now be outlined. Let A be a given polynomial and $$A=M_1M_2 \tag{44}$$

where $M_1$ and $M_2$ are factors of A, then $$A=\left(\frac{M_1+M_2}{2}\right)^2-\left(\frac{M_1-M_2}{2}\right)^2$$
$$A^2=\left(\frac{M_1^2+M_2^2}{2}\right)^2-\left(\frac{M_1^2-M_2^2}{2}\right)^2 \tag{45}$$

If the linear factors of A are known, it can always be put in the Forms 44 and 45. Instead of partitioning the polynomial as in (44) by the use of its linear factors $(x_k-x)$ where $x_k$ is a root of A, it can be partitioned by irrational factors obtained from $(x_k-x)$. When A is an even polynomial, it is convenient to use the following identity

(46)
$$1-\frac{x^2}{x_k^2}=\frac{x^2}{\alpha^2}\left[\sqrt{\frac{\alpha^2}{x^2}-1}+\sqrt{\frac{\alpha^2}{x_k^2}-1}\right]\left[\sqrt{\frac{\alpha^2}{x^2}-1}-\sqrt{\frac{\alpha^2}{x_k^2}-1}\right]$$

where $\alpha$ is a real numerical parameter. When A is odd, it is convenient to use the following two identities:

(47)
$$1-\frac{x^2}{x_k^2}=\frac{\alpha^2}{x_k^2}\left[\sqrt{1-\frac{x^2}{\alpha^2}}+\sqrt{1-\frac{x_k^2}{\alpha^2}}\right]\left[\sqrt{1-\frac{x^2}{\alpha^2}}-\sqrt{-1\frac{x_k^2}{\alpha^2}}\right]$$

(48)
$$x=\frac{\alpha}{2}\left(\sqrt{1+\frac{x}{\alpha}}+\sqrt{1-\frac{x}{\alpha}}\right)\left(\sqrt{1+\frac{x}{\alpha}}-\sqrt{1-\frac{x}{\alpha}}\right)$$

These sets of irrational factors can be used to partition even and odd polynomials as in (44) which are always of the form

(49)
$$A_{2m+1}=h\cdot x\prod_1^m\left(1-\frac{x^2}{x_k^2}\right)\text{ even}$$
$$A_{2m}=h.\prod_1^m\left(1-\frac{x^2}{x_k^2}\right)\text{ odd}$$

where the subscripts denote the degree of the polynomial and $h$ is a constant.

For odd polynomials the partition functions are

(50)
$$M_1=\sqrt{\frac{\alpha h}{2}}\cdot\prod_1^m\frac{\alpha}{x_k}\cdot\left(\sqrt{1+\frac{x}{\alpha}}+\sqrt{1-\frac{x}{\alpha}}\right)\cdot\prod_1^m\left(\sqrt{1-\frac{x^2}{\alpha^2}}+(-)^k\sqrt{1-\frac{x_k^2}{\alpha^2}}\right)$$
$$M_2=\sqrt{\frac{\alpha h}{2}}\cdot\prod_1^m\frac{\alpha}{x_k}\cdot\left(\sqrt{1+\frac{x}{\alpha}}-\sqrt{1-\frac{x}{\alpha}}\right)\cdot\prod_1^m\left(\sqrt{1-\frac{x^2}{\alpha^2}}-(-)^k\sqrt{1-\frac{x_k^2}{\alpha^2}}\right)$$

If the product term $$\prod_1^m\left(\sqrt{1-\frac{x^2}{\alpha^2}}+(-)^k\sqrt{1-\frac{x_k^2}{\alpha^2}}\right)$$

taken as a polynomial in $$\sqrt{1-\frac{x^2}{\alpha^2}}$$

is expanded, and if $F_1$ denotes the even, and $$\sqrt{1-\frac{x^2}{\alpha^2}}F_2$$

the odd part of this expansion, $F_1$ and $F_2$ being polynomials in $$\frac{x}{\alpha},\text{ then }\frac{M_1^2+M_2^2}{2}\text{ and }\frac{M_1^2-M_2^2}{2}$$

become:

(51)
$$\frac{M_1^2+M_2^2}{2}=\alpha\cdot h\cdot\prod_1^m\frac{\alpha}{x_k}\cdot 1\left[(F_1+F_2)^2-\frac{x^2}{\alpha^2}F_2(2F_1-F_2)\right]$$
$$\frac{M_1^2-M_2^2}{2}=\alpha\cdot h\cdot\sqrt{1-\frac{x^2}{\alpha^2}}\cdot\prod_1^m\frac{\alpha}{x_k}\cdot\left[(F_1+F_2)^2-\frac{x_2}{\alpha_2}F_2^2\right]$$

Defining the polynomials $P_{2m-2}$ and $B_{2m}$ as:

(52)
$$P_{3m-2}=\frac{M_1^2+M_2^2}{2};\ \sqrt{1-\frac{x^2}{\alpha^2}}B_{2m}=\frac{M_1^2-M_2^2}{2}$$

then for $A_{2m+1}$ we have

(53)
$$A_{2m+1}^2=P_{2m-2}^2-\left(1-\frac{x^2}{\alpha^2}\right)B_{2m}^2$$

For the even polynomial the partition functions $M_1$ and $M_2$ become:

(54)
$$M_1=\sqrt{h}\cdot\left(\frac{x}{\alpha}\right)^{m}\prod_1^m\left(\sqrt{\frac{\alpha^2}{x^2}-1}-(-)^k\sqrt{\frac{\alpha^2}{x_k^2}-1}\right)$$
$$M_2=\sqrt{h}\cdot\left(\frac{x}{\alpha}\right)^{m}\prod_1^m\left(\sqrt{\frac{\alpha^2}{x^2}-1}+(-)^k\sqrt{\frac{\alpha^2}{x_k^2}-1}\right)$$

In the case of this product it is convenient to take $$\frac{x^m}{\alpha^m}$$

times the even part of the expansion of $$\prod_1^m\sqrt{\frac{\alpha^2}{x^2}-1}-(-)^k\sqrt{\frac{\alpha^2}{x_k^2}-1}$$

as the polynomial $F_1$ and $$\frac{x^m}{\alpha^m}$$

times the odd part as $$\sqrt{1-\frac{x^2}{\alpha^2}}\frac{x}{\alpha}F_2$$

when $m$ is even, or $$\sqrt{1-\frac{x^2}{\alpha^2}}F_2$$

when $m$ is odd.

In which case:

(55)
$$P_{2m-2}=\frac{M_1^2+M_2^2}{2}=h.\left[F_1^2+\left(1-\frac{x^2}{\alpha 2}\right)\frac{x^2}{\alpha 2}F_2^2\right]\ m\text{ even}$$
$$P_{2m-2}=\frac{M_1^2+M_2^2}{2}=h.\left[\left(1-\frac{x^2}{\alpha^2}\right)F_1^2+\frac{x^2}{\alpha^2}F_2^2\right]\ m\text{ odd}$$

(56)
$$\frac{M_1^2-M_2^2}{2}=2h\sqrt{1-\frac{x^2}{\alpha 2}}\frac{x}{\alpha}F_1F_2=\sqrt{1-\frac{x^2}{\alpha^2}}B_{2m-1}\ m\text{ odd or even}$$

and for $A_{2m}$ we have:

(57)
$$A_{2m}^2=P_{2m-2}^2-\left(1-\frac{x^2}{\alpha^2}\right)B_{2m-1}^2$$

which is the same form as (53).

It will be noted that only one value of $\alpha$ will satisfy Equations 57 or 52. This is the value of $\alpha$ which allows the polynomial P to be of reduced degree, $2m-2$. This value of $\alpha$ is:

(58)
$$\tfrac{1}{2}+\sum_1^m(-)^k\sqrt{1-\frac{x_k^2}{\alpha^2}}=0\text{ odd polynomials}$$

(59)
$$\sum_1^n(-)^k\sin^{-1}\frac{x_k}{\alpha}=\pm\frac{\pi}{4}\text{ even polynomials}$$

A systematic procedure has been outlined above for deriving from a given even or odd polynomial, in the variable $x$, two other polynomials which satisfy a quasi-Pythagorean relationship. In the notation employed in this derivation the subscripts using the letter $m$ indicate the degree of the polynomial. For the odd polynomials $A_{2m+1}$ there exist two other even polynomials $P_{2m-2}$ and $B_{2m}$ such that

(60)
$$A_{2m+1}^2=P_{2m-2}^2-\left(1-\frac{x^2}{\alpha^2}\right)B_{2m}^2$$

and for an even polynomial $A_{2m}$ there exists an even polynomial $P_{2m-2}$ and an odd polynomial $B_{2m-1}$ such that $$A_{2m}^2=P_{2m-2}^2-\left(1-\frac{x^2}{\alpha^2}\right)B_{2m-1}^2 \tag{61}$$

When the polynomials have the degrees indicated the polynomials $P_{2m-2}$, $B_{2m}$, $B_{2m-1}$ and $\alpha$ are uniquely determined by the roots and the multiplying factor of the original polynomials $A_{2m}$, $A_{2m+1}$.

The even and odd polynomials $A_{2m}$ and $A_{2m+1}$ may be identified with the $C_n$ and $S_n$ polynomials described previously by means of the substitution:

$$x=\frac{\omega}{\pi}$$

$$A_{2m+1}\left(\frac{\omega}{\pi}\right)=S_n(\omega)=\omega\prod_1^n\left(1-\frac{\omega^2}{\pi^2k^2}\right) \tag{62}$$

$$A_{2m}\left(\frac{\omega}{\pi}\right)=C_n(\omega)=\prod_1^n\left[1-\left(\frac{2\omega}{\pi(2k-1)}\right)^2\right] \tag{63}$$

The polynomials derived from the set (62) and (63), as defined by (60) and (61) are:

$$S_n^2=P_{n-1}'^2-\left(1-\frac{\omega^2}{\alpha^2}\right)B_{en}^2 \tag{64}$$

$$C_n^2=P_{n-1}^2-\left(1-\frac{\omega^2}{\alpha^2}\right)B_{on}^2 \tag{65}$$

where $B_{en}$ is an even polynomial, and
$B_{on}$ is an odd polynomial.

It can be shown that the even P polynomials have no roots at real frequencies, that the roots of $B_{en}$ and $B_{on}$ are all real, and that these roots separate the roots of the corresponding polynomials $S_n$ and $C_n$. Moreover, as $n$ becomes large it can be shown that the polynomial $B_{en}$ asymptotically approaches $C_n$ as a limit as does the polynomial $B_{on}$ approach $S_{n-1}$.

By virtue of this asymptotic relationship the set of polynomials $S_n$, $C_n$, and $P_n$ are particularly useful in specifying the response function of networks having linear phase characteristics.

Let $$e^{-(\alpha_0+jB)}$$

be the complex response function defined by (4); it has the following value if $P'_{n-1}$, $C_n$, $S_n$, are substituted for $P_1(\omega)$, $P_2(\omega)$, $P_3(\omega)$.

$$e^{-(\alpha_0+jB)}=\frac{P'_{n-1}}{C_n+jS_n} \tag{66}$$

$$P_{n-1}'^2=S_n^2+\left(1+\frac{\omega^2}{\alpha^2}\right)B_{en}^2 \tag{66a}$$

Referring to Equation (6), the roots of the open circuit transfer impedance $Z_{12}$ are seen to be given by:

$$S_n^2+\left(1-\frac{\omega^2}{\alpha^2}\right)B_{en}^2=0 \text{ and} \tag{66b}$$

$$C_n^2+\left(1-\frac{\omega^2}{\alpha^2}\right)B_{on}^2=0 \tag{66c}$$

The squared magnitude of the amplitude response will be given by multiplying (66) by its conjugate; i. e.:

$$e^{2-\alpha_0}=\frac{P_{n-1}'^2}{C_n^2+S_n^2} \tag{67}$$

If we replace $S_n$ in this formula by its value given in (64) then (67) becomes:

$$e^{-2\alpha_0}=\frac{1}{1+\left[\frac{C_n^2-\left(1-\frac{\omega^2}{\alpha^2}\right)B_{en}^2}{P_{n-1}'^2}\right]} \tag{68}$$

Starting with the set of polynomials $P_{n-1}$, $C_n$, $S_n$, and substituting for $C_n$ its value given by (64) results in a second expression for $$e^{-2\alpha_0}$$

$$e^{-2\alpha_0}=\frac{P_{n-1}^2}{C_n^2+S_n^2} \tag{69}$$

$$e^{-2\alpha_0}=\frac{1}{1+\left[\frac{S_n^2-\left(1-\frac{\omega^2}{\alpha^2}\right)B_{on}^2}{P_{n-1}^2}\right]} \tag{70}$$

Inspection of these last two formulae shows that when the bracketed term is small, the loss introduced by the network is small; and when it is large, the loss is large. In Equation 68 the bracket expression will be small at roots of both $C_n$ and $B_{en}$ provided the roots of both polynomials are nearly coincident, as will be the case in Equation 70 at the roots of $S_n$ and $B_{on}$ provided their roots are nearly coincident. It can be verified that these coincidence conditions obtain for large n. Experimentally it has been found that even for relatively small values of $n$ filters designed according to Formulae 68 and 70 exhibit this behavior to an acceptable extent. The phase characteristic of these networks is given by (20). The cutoff region of these filters begins at the largest root $C_n$ cutoff Formulae 68 is used and at the largest root of $S_n$ when Formula 70 is used. In both cases the attenuation increases at the rate of 18 db per octave at frequencies substantially above cutoff.

Where exceptional phase linearity is required, the polynomials $$S_n' \text{ and } C_n'$$

can be used in place of $S_n$ and $C_n$ to determine the corresponding P polynomials.

It will be noted that particular partition functions $M_1$ and $M_2$ as defined in (50) or (54) have been employed in this analysis. These choices always lead to P polynomials having no real roots. Other choices for partition functions may lead to other types of P polynomials which are useful in the design of networks. The criterion is the satisfaction of Equation 57 or 60 by polynomials of appropriate degree.

The class of filters just described is characterized by their monotonic behavior in the attentuation region. This resulted from a particular choice of factoring and partitioning of a given network polynomial A. The partitioning method described is capable of considerable generalization and one variation of it leads to P polynomials producing peaks of infinite loss in the attenuation band of the corresponding network.

Starting with the given A polynomial, which may be either the odd $S_n$ or even $C_n$ polynomials, certain of its roots may be assigned to the transmission interval for producing uniform delay, and certain of its roots lying outside this interval can be used to produce infinite loss points in the attenuation band of the filter. For example, the polynomial $S_{n+1}$ contains $n+1$ factors of the form $$1-\frac{\omega^2}{\pi^2 i^2}$$

and is related to $S_n$ by the formula $$S_{n+1}=S_n\left(1-\frac{\omega^2}{\pi^2(n+1)^2}\right) \tag{71}$$

We can assign all but the largest pair of positive and negative roots of $S_{n+1}$ to the transmission range, and these last roots to the attenuation range. Instead of using the set of polynomials $S_{n+1}$, $P'_n$, $C_{n+1}$, one can use the set $$S_{n+1},\ \left(1-\frac{\omega^2}{\pi^2(n+1)^2}\right)P'_{n-1},\ C_{n+1}$$

The P′ polynomials being defined by (60), so that:

72

$$S_{n+1}^2=\left[1-\frac{\omega^2}{\pi^2(n+1)^2}\right]^2 P'^2_{n-1}-\left[1-\frac{\omega^2}{\alpha^2}\right]\left[1-\frac{\omega^2}{\pi^2(n+1)^2}\right]^2 B^2_{en}$$

Formula 68 for the response becomes:

(72a)

$$e^{-2\alpha_0}=\frac{1}{1+\left[\dfrac{C^2_{n+1}-\left(1-\dfrac{\omega^2}{\alpha^2}\right)\left(1-\dfrac{\omega^2}{\pi^2(n+1)^2}\right)^2 B^2_{en}}{\left[1-\dfrac{\omega^2}{\pi^2(n+1)^2}\right]^2 P'^2_{n-1}}\right]}$$

The nearly coincident roots of $C_{n+1}$ and $B_{en}$ which define the transmission range include all but the largest roots of $C_{n+1}$. The cutoff region thus begins at the next largest root of $C_{n+1}$. The bracketed form becomes infinitely large for $\omega=\pi(n+1)$ where the network response is zero. Additional infinite loss, or zero response frequencies, can be introduced by a continuation of this process. The next set of polynomials in this scheme are $$\frac{S_{n+2}}{S_n}P'_{n-1}$$

$C_{n+2}$ and in general $S_{n+1}$ $$\left(\frac{S_{n+i}}{S_n}P'_{n-1}\right),\ C_{n+i}$$

As in the case of the low-pass monotonic filters the attenuation of this class of filters increases at the rate of 18 db per octave at frequencies substantially above cutoff. A similar class of filters are defined by the set of polynomials $$S_{n+i}\frac{S_{n+i}}{S_n}P_n,\ C_{n+i}$$

The same procedure can be used to define a class of linear phase bandpass filters. Thus starting with the even polynomial $$\frac{S_n}{\omega}$$

P″ and B″ polynomials are determined from the general procedure given for even polynomials in (65) i. e., $$\left(\frac{S_n}{\omega}\right)^2=P''^2_{n-1}-\left(1-\frac{\omega^2}{\alpha^2}\right)B''^2_{on}$$

(73) or $$S_n^2=\left(\omega P''_{n-1}\right)^2-\left(1-\frac{\omega^2}{\alpha^2}\right)\left(\omega B''_{on}\right)^2$$

using the set of polynomials $$S_n,\ \omega P''_{n-1} \text{ and } C_n$$

leads to the following loss characteristic:

(74)

$$e^{-2\alpha_0}=\frac{1}{1+\left[\dfrac{C_n-\left(1-\dfrac{\omega^2}{\alpha^2}\right)\omega^2 B''^2_{on}}{\omega^2 P''^2_{n-1}}\right]}$$

In (74) it can be shown that the roots of $B_{on}$ separate the roots of $S_n$ and that the nearly coincident root condition obtains between $C_n$ and $B_{on}$. The transmission range is thus defined by these nearly coincident roots and extends up to approximately the largest root of $C_n$. Above this frequency the attenuation increases and approaches the 18 db per octave asymptote. The attenuation also increases for frequencies below the smallest root of $C_n$ and becomes infinite at zero frequency. At very low frequencies the attenuation increases at the rate of 6 db per octave.

As in the low-pass case, frequencies of infinite attenuation can be introduced into the low-frequency attenuation interval by assigning certain of the smallest roots of the polynomials $S_n$ and $C_n$ to the low frequency attenuation interval. A set of network polynomials specifying a network having infinite loss frequencies in both the upper and lower attenuation intervals can be derived as follows: Let (75)

$$S_n=_{p+m+q}$$

where $q$ denotes that the $q$ largest pairs of positive and negative roots of the polynomial $S_n$ are assigned to the upper attenuation interval and where $p$ denotes that the $p$ smallest finite pairs of roots are assigned to the lower attenuation interval along with the zero root. We define symbolically the even polynomial obtained by deleting the $p$ and $q$ factors from $S_n$ by $E_{n-p-q}$ which is a polynomial of degree $2m$ in $\omega$ and is given by:

(76)

$$E_{n-p-q}=\frac{S_{p+m}}{S_p}$$

its roots are:

(77) $\omega_r=\pm\pi r \quad r=p+1,\ p+2,\ \ldots\ (p+m)$

These roots define the transmission and linear phase interval of the network. The polynomial $P_{m-1}$ is defined by means of the relation (65) i. e., (78)

$$\left(\frac{S_{p+m}}{S_p}\right)^2=E^2_{n-p-q}=P^2_{m-1}-\left(1-\frac{\omega^2}{\alpha^2}\right)B^2_{om}$$

The desired set of polynomials in this notation then becomes $$S_n,\ \left(S_p\cdot P_{m-1}\cdot\frac{S_n}{S_{p+m}}\right),\ C_n$$

Where it is obvious that the $p$ factors are simply $S_p$ and the $q$ factors $$\frac{S_n}{S_{p+m}}$$

where $n=p+m+q$. The low frequency cutoff of these networks begins at $$\omega=\left(p+\frac{3}{2}\right)\pi$$

and the attenuation characteristic here will have $p$ infinite loss frequencies and a 6 db per octave asymptote. The high frequency cutoff begins at $\omega=p+m-\tfrac{1}{2}\pi$, and it will have $q$ infinite loss points and an 18 db per octave asymptote.

The loss characteristic will be given by:

(79)

$$e^{-2\alpha_0}=\frac{1}{1+\left[\dfrac{C_n^2-\left(1-\dfrac{\omega^2}{\alpha^2}\right)\left(S_p\cdot B_{om}\cdot\dfrac{S_n}{S_{p+m}}\right)^2}{\left(S_p\cdot P_{m-1}\cdot\dfrac{S_n}{S_{p+m}}\right)^2}\right]}$$

As in illustration of the irrational factoring procedure for determination of the P polynomials, consider basic structure number four. Here we may assume that a relatively wide bandpass structure is required. The response of number four is given by:

(80)

$$\frac{P_1(\omega)}{C_4(\omega)+jS_4(\omega)}$$

In order to determine $P_1(\omega)$, consider the polynomial $S_4$:

(81)

$$S_4=\omega\left(1-\frac{\omega^2}{\pi^2}\right)\left(1-\frac{\omega^2}{4\pi^2}\right)\left(1-\frac{\omega^2}{9\pi^2}\right)\left(1-\frac{\omega^2}{16\pi^2}\right)$$

We may group the factors of $S_4$ in the following manner (82)

$$S_4=\omega\frac{S_2}{\omega}\left(1-\frac{\omega^2}{9\pi^2}\right)\left(1-\frac{\omega^2}{16\pi^2}\right)$$

in which the intent is to introduce frequencies of infinite attenuation at the points $\omega=0$, $\omega=3\pi$, and $\omega=4\pi$. Consider now the polynomial

(83) $$\frac{S_2}{\omega}=\left(1-\frac{\omega^2}{\pi^2}\right)\left(1-\frac{\omega^2}{4\pi^2}\right)=1-\frac{5\omega^2}{4\pi^2}+\frac{\omega^4}{4\pi^4}$$

Regrouping the terms and completing the square, we have

(84) $$\frac{S^2}{\omega}=1-\frac{2\sqrt{2}}{4}\frac{\omega^2}{\pi^2}+\frac{\omega^4}{8\pi^4}+\frac{2\sqrt{2}}{4\pi^2}\omega^2-\frac{5\omega^2}{4\pi^2}+\frac{\omega^4}{8\pi^4}$$

or:

(85) $$\frac{S^2}{\omega}=\left[1-\frac{\sqrt{2}\omega^2}{4\pi^2}\right]^2-\frac{5-2\sqrt{2}}{4\pi^2}\omega^2\left[1-\frac{\omega^2}{2[5-2\sqrt{2}]\pi^2}\right]$$

Thus:

(86) $$\left[\frac{S_2}{\omega}\right]^2=\left\{\left[1-\frac{\sqrt{2}\omega^2}{4\pi^2}\right]^2-\frac{5-2\sqrt{2}}{4\pi^2}\omega^2\left[1-\frac{\omega^2}{2[5-2\sqrt{2}]\pi^2}\right]\right\}^2$$

It is apparent that

(87) $$\left[\frac{S^2}{\omega}\right]^2=\left\{\left[1-\frac{\sqrt{2}\omega^2}{4\pi^2}\right]^2+\frac{5-2\sqrt{2}}{4\pi^2}\omega^2\left[1-\frac{\omega^2}{2[5-2\sqrt{2}]\pi^2}\right]\right\}^2-\frac{5-2\sqrt{2}}{\pi^2}\omega^2\left[1-\frac{\omega^2}{2(5-2\sqrt{2})\pi^2}\right]$$

or:

(88) $$\left[\frac{S_2{}^2}{\omega}\right]^2=\left\{1-\frac{4\sqrt{2}-5}{4\pi^2}\omega^2\right\}^2-\left[1-\frac{\omega^2}{2[5-2\sqrt{2}]\pi^2}\right]\frac{5-2\sqrt{2}}{\pi^2}\omega^2$$

Squaring (82) and substituting (88) we obtain:

(89) $$S_4{}^2=\omega^2\left[\frac{S^2}{\omega}\right]^2\left(1-\frac{\omega^2}{9\pi^2}\right)^2\left(1-\frac{\omega^2}{16\pi^2}\right)^2=$$
$$\omega^2\left[1-\frac{4\sqrt{2}-5}{4\pi^2}\omega^2\right]^2\left(1-\frac{\omega^2}{9\pi^2}\right)^2\left(1-\frac{\omega^2}{16\pi^2}\right)^2-$$
$$\left[1-\frac{\omega^2}{2(5-2\sqrt{2})\pi^2}\right]\frac{5-2\sqrt{2}}{\pi^2}\omega^4\left(1-\frac{\omega^2}{9\pi^2}\right)^2\left(1-\frac{\omega^2}{16\pi^2}\right)^2$$

This expression is of the form of Equation 64. Thus we may make the following identification:

(90) $$P_1(\omega)=\omega\left(1-\frac{4\sqrt{2}-5}{4\pi^2}\omega^2\right)\left(1-\frac{\omega^2}{9\pi^2}\right)\left(1-\frac{\omega^2}{16\pi^2}\right)$$

If we introduce the parameter K, the response of the network becomes:

(91) $$\frac{\omega\left(1-\frac{4\sqrt{2}-5}{4\pi^2}\omega^2\right)\left(1-\frac{\omega^2}{9\pi^2}\right)\left(1-\frac{\omega^2}{16\pi^2}\right)}{C_4(\omega)+jK\,S_4(\omega)}$$

If the parameter is varied, a suitable value which represents a compromise between amplitude and delay characteristic will be found to be:

(92) $$K=\frac{1}{1.35}$$

Figure 16A:
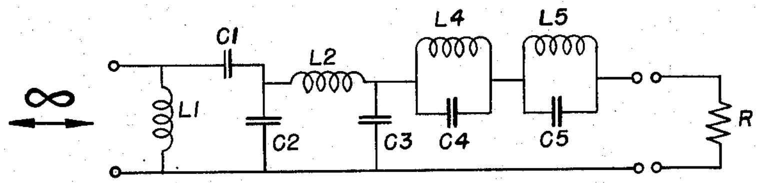
Figures 15A, 16B:
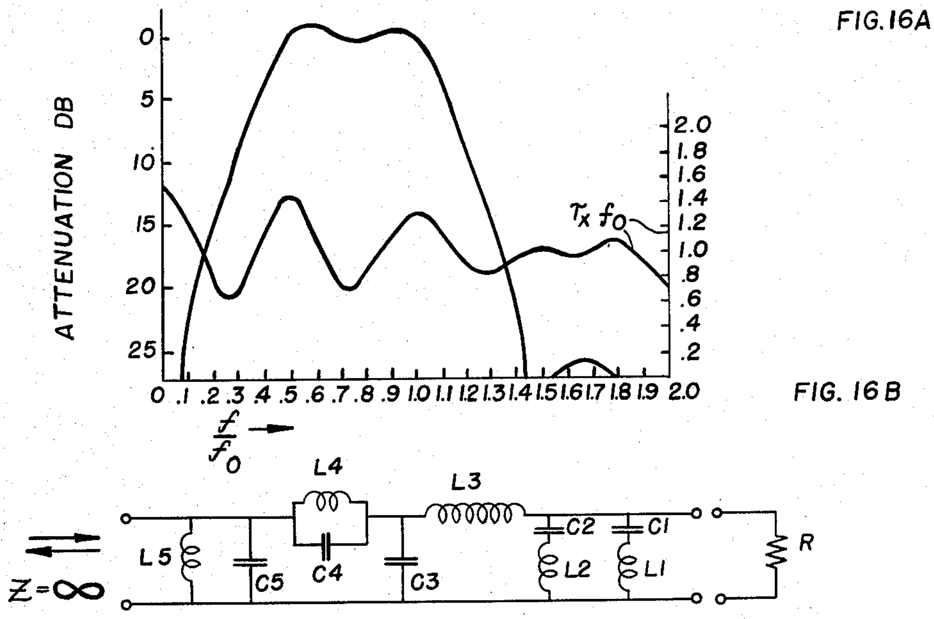
Figure 15B:
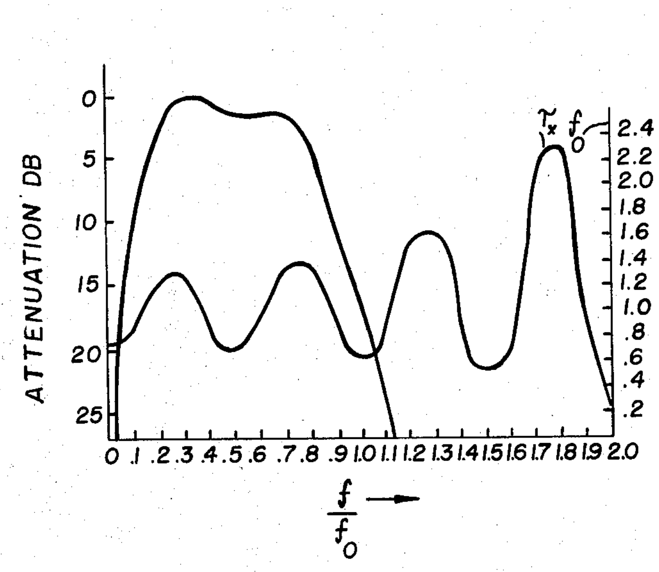

A typical circuit configuration and response curves for the network are shown in Figs. 15A and 15B respectively. Values for the elements shown in Fig. 15A are as listed below where values of L are in henries, C in farads, R in ohms and $f$ in cycles per second.

$$L1=\frac{.190365Ro}{fo}\qquad C1=\frac{.0332654}{Rofo}$$
$$L2=\frac{.356935Ro}{fo}\qquad C2=\frac{.0315405}{Rofo}$$
$$L3=\frac{.187970Ro}{fo}\qquad C3=\frac{.187951}{Rofo}$$
$$L4=\frac{.190703Ro}{fo}\qquad C4=\frac{.0872474}{Rofo}$$
$$L5=\frac{.621327Ro}{fo}\qquad C5=\frac{.359138}{Rofo}$$
$$R=1.35Ro$$

*Empiric determination of polynomial $P_1(\omega)$*

In the design of a filter it is often convenient to resort to empirical procedures in determining the polynomial $P_1(\omega)$. In some instances it is possible to select a polynomial which does not introduce any additional independent polynomial coefficients into the Expression 4, and obtain an amplitude response characteristic that is useful and desirable. In this case the final filter will employ the same number of elements as the basic structure. In other cases it may be possible to determine $P_1(\omega)$ empirically in such a way as to yield a desirable amplitude response and keep the number of independent polynomial coefficients introduced into $P_1(\omega)$ a minimum.

In determining $P_1(\omega)$ empirically for a structure of complexity N, it is necessary to study the nature of the function $D_N(\omega)$. If an appropriate polynomial $P_1(\omega)$ is found such that $$\frac{|P_1(\omega)|}{D_N(\omega)}$$

yields a desirable response, this polynomial may be employed in the final filter provided, of course, that the law of conservation of energy is not violated thereby.

As an illustration of such procedure, consider the basic filter corresponding to No. 4. Here

(93) $$D_4(\omega)=\sqrt{[C_4(\omega)]^2+K^2[S_4(\omega)]^2}$$

(94) $$C_4(\omega)=\left(1-\frac{4\omega^2}{\pi^2}\right)\left(1-\frac{4\omega^2}{9\pi^2}\right)\left(1-\frac{4\omega^2}{25\pi^2}\right)\left(1-\frac{4\omega^2}{49\pi^2}\right)$$

(95) $$S_4(\omega)=\omega\left(1-\frac{\omega^2}{\pi^2}\right)\left(1-\frac{\omega^2}{4\pi^2}\right)\left(1-\frac{\omega^2}{9\pi^2}\right)\left(1-\frac{\omega^2}{16\pi^2}\right)$$

To preserve phase linearity through the high frequency cut-off region of the filter it may be desirable to introduce frequencies of infinite attenuation at the high frequency end of the region of linear phase. This may be done by introducing into $P_1(\omega)$ real roots corresponding to the high frequency roots of $S_4(\omega)$. This introduces no additional independent polynomial coefficients into Expression 4 and $P_1(\omega)$ takes the form

(96) $$P_1(\omega)=Q(\omega)\left(1-\frac{\omega_2}{9\pi^2}\right)\left(1-\frac{\omega^2}{16\pi^2}\right)$$

Where $Q(\omega)$ is the remaining factor in the polynomial $P_1(\omega)$ yet to be determined. It may be verified that over a wide and useful frequency range the expression

(97) $$\frac{\left(1-\frac{\omega^2}{9\pi^2}\right)\left(1-\frac{\omega^2}{16\pi^2}\right)}{\sqrt{[C_4(\omega)]^2+[S_4(\omega)]^2}}$$

varies roughly as $$\frac{1}{\omega^2}$$

Hence $Q(\omega)$ may be determined accordingly and

(98) $$Q(\omega)=\omega^2$$

Now the amplitude response of the filter will be given by the expression

(99) $$\frac{\left|\omega^2\left(1-\frac{\omega^2}{9\pi^2}\right)\left(1-\frac{2}{16\pi^2}\right)\right|}{\sqrt{[C_4(\omega)]^2+K^2[S_4(\omega)]^2}}$$

If the parameter K is varied, a satisfactory amplitude and delay characteristic will be found for the value $K=1.5$.

The final filter response characteristic, then, takes the form $$\frac{\omega^2\left(1-\frac{\omega^2}{9\pi^2}\right)\left(1-\frac{\omega^2}{16\pi^2}\right)}{C_4(\omega)+j1.5S_4(\omega)} \tag{100}$$

Amplitude and delay characteristics of this filter together with a typical circuit configuration are shown in Figs. 16B and 16A respectively. Values for the circuit elements shown in Fig. 16A are as listed below with values of C in farads, L in henries, and R in ohms.

$$L_1=\frac{.347733R_o}{f_o} \quad L_2=\frac{.259280R_o}{f_o} \quad L_4=\frac{.0308808R_o}{f_o}$$

$$L_5=\frac{.0340191R_o}{f_o} \quad C_1=\frac{.524325}{R_of_o} \quad C_2=\frac{.285546}{R_of_o}$$

$$C_3=\frac{.190129}{R_of_o} \quad C_4=\frac{.364560}{R_of_o} \quad C_5=\frac{.186148}{R_of_o}$$

$$R=1.5R_o \qquad L_3=0$$

$f_o$ represents frequency in cycles per second.

*Networks having linear phase over a frequency range excluding zero frequency*

Figure 17:
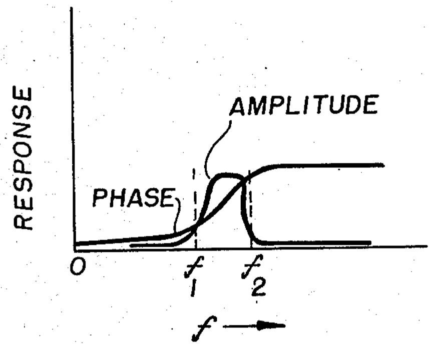

It has been shown that through the use of polynomials $C_n(\omega)$ and $S_n(\omega)$ networks may be defined which have a linear phase and constant time delay characteristic through a frequency range including zero frequency. These networks may have, within limits, any desired amplitude characteristic including the band pass characteristic. In some cases it may be desirable to include in the band of frequencies under consideration a relatively narrow range of frequencies not including zero frequency. In this event a better phase and amplitude characteristic may be had if the phase characteristic is allowed to depart substantially from linearity at frequencies lower than the range under consideration. Such a characteristic is illustrated in Fig. 17 in which the phase characteristic is substantially linear in the range $f_1$–$f_2$.

It is apparent that a network may be designed for appropriate response throughout a frequency range including zero frequency and by means of a process equivalent mathematically to a change of variable, transformed into a network for some other frequency range not including zero frequency. For example, the frequency transformation $$\omega'=\frac{\omega^2-\omega_o^2}{\omega} \tag{101}$$

accomplishes this, provided that the band width of the transformed structure is narrow. In such case the response of the transformed structure will be very nearly that of the untransformed structure except that it will be approximately symmetrical about the fixed angular frequency $\omega_o$ and will not include zero frequency. If a desirable response over a frequency range including zero frequency is given by $$\frac{P_1(\omega)}{C_n(\omega)+jS_n(\omega)} \tag{102}$$

Then a desirable response over a frequency range including $\omega_o$ is given by $$\frac{P_1\left(\frac{\omega^2-\omega_o^2}{\omega}\right)}{C_n\left(\frac{\omega^2-\omega_o^2}{\omega}\right)+jS_n\left(\frac{\omega^2-\omega_o^2}{\omega}\right)} \tag{103}$$

provided the frequency range in (103) is small.

A better phase and delay characteristic over a restricted frequency range not including zero frequency may be had by employing $$\frac{C_i(\omega)}{C_{i-n}(\omega)} \tag{104}$$

as the even polynomial in place of $C_n$ and $$K_n\omega\frac{S_i(\omega)}{S_{i-n}(\omega)} \tag{105}$$

as the odd polynomial in place of $S_n$. Under these conditions the response of the network becomes $$\frac{P_1\omega}{\frac{C_i(\omega)}{C_{i-n}(\omega)}+jK_n\omega\frac{S_i(\omega)}{S_{i-n}(\omega)}} \tag{106}$$

Now the roots of the polynomials $$\frac{C_i(\omega)}{C_{i-n}(\omega)} \text{ and } K_n\omega\frac{S_i(\omega)}{S_{i-n}(\omega)}$$

are equally spaced in frequency over the range from $$\omega^2=\frac{[2(i-n)+1]^2\pi^2}{4} \tag{107}$$

$$\omega^2=i^2\pi^2 \tag{108}$$

As before, an appropriate value of $K_n$ may be found which will minimize the ripple in the delay characteristic over a range in frequency internal to that given by the frequency limits (107) and (108). $P_1(\omega)$ may be determined in accordance with the desired amplitude response in a manner analogous to that previously utilized for any of the methods of determining $P_1(\omega)$ for the case in which the frequency range under consideration includes zero frequency.

As before, an exceptionally constant delay characteristic may be obtained over a range by varying the position of the lowest frequency non-zero root and the highest frequency root of the set $$\frac{C_i(\omega)}{C_{i-n}(\omega)},\ K_n\omega\frac{S_i(\omega)}{S_{i-n}(\omega)}$$

on the frequency scale.

What is claimed is:

1. A network having a pair of input terminals and a pair of output terminals for electrical wave transmission of a finite range of wave frequencies, said network comprising inter-connected reactance elements, a load resistor connected across said pair of output terminals, said input terminals providing means for connecting a source of input voltage thereto, said output terminals providing means to derive an output voltage across said load resistor, said reactances having such values that the phase angle between input and output voltages takes on incremental values of $$\frac{\pi}{2}$$

radians at substantially equally spaced intervals throughout said range of wave frequencies, and the input and output voltages have a ratio which assumes certain predetermined values throughout said range of wave frequencies, said network having an open circuit transfer impedance whose roots are determined by the expression:

$$S_n^2+\left(1-\frac{\omega^2}{\alpha^2}\right)B_{en}^2=0$$

wherein:

$S_n$ is a trigonometric polynomial in terms of frequency $\omega$ and whose roots coincide with the first $n$ positive and negative roots of cos $\omega$, $\omega$ is the angular frequency, $\alpha$ is a real numerical parameter, $B_{en}$ is a polynomial in terms of even powers of angular frequency $\omega$, and $n$ is an integer.

2. A four terminal network for transmitting a limited range of signal frequencies comprising a plurality of interconnected substantially non-dissipative elements having an amplitude and phase response defined by the expression:

$$\frac{P}{C_n+jS_n}$$

wherein:

P is a polynomial in terms of angular frequency $\omega$,
$C_n$ is a trigonometric polynomial in terms of angular frequency $\omega$ and whose roots coincide with the first $n$ positive and negative roots of cos $\omega$,
$S_n$ is a trigonometric polynomial in terms of angular frequency $\omega$ with a root at zero and whose non-zero roots coincide with the first $n$ positive and negative non-zero roots of sin $\omega$, and
$n$ is an integer.

3. A network in accordance with claim 2, wherein said response is further defined by the expression:

$$\frac{P\left[\frac{\omega^2-\omega_o^2}{\omega}\right]}{C_n\left[\frac{\omega^2-\omega_o^2}{\omega}\right]+jS_n\left[\frac{\omega^2-\omega_o^2}{\omega}\right]}$$

and wherein $\omega_0$ is a fixed angular frequency lying within the transmission range.

4. A four terminal network for transmitting a limited range of signal frequencies comprising a plurality of interconnected substantially non-dissipative elements having an open circuit driving point impedance defined by the expression:

$$Z_L=\frac{S_n}{C_n}$$

and an open circuit transfer impedance defined by the expression:

$$Z_T=\frac{P}{C_n}$$

wherein:

P is a polynomial in terms of odd powers of angular frequency $\omega$,
$C_n$ is a trigonometric polynomial in terms of angular frequency $\omega$ and whose roots coincide with the first $n$ positive and negative roots of cos $\omega$,
$S_n$ is a trigonometric polynomial in terms of angular frequency $\omega$ with a root at zero and whose non-zero roots coincide with the first $n$ positive and negative non-zero roots of sin $\omega$, and
$n$ is an integer.

5. A network in accordance with claim 4, wherein the driving point impedance is defined by the expression:

$$\frac{S_n\left[\frac{\omega^2-\omega_o^2}{\omega}\right]}{C_n\left[\frac{\omega^2-\omega_o^2}{\omega}\right]}$$

and the open circuit transfer impedance is defined by the expression:

$$\frac{P\left[\frac{\omega^2-\omega_o^2}{\omega}\right]}{C_n\left[\frac{\omega^2-\omega_o^2}{\omega}\right]}$$

and where $\omega_0$ is a fixed angular frequency.

6. A four terminal network for transmitting a limited range of signal frequencies comprising a plurality of interconnected substantially non-dissipative elements having an open circuit driving point impedance defined by the expression:

$$Z_L=\frac{C_n}{S_n}$$

and an open circuit transfer impedance defined by the expression:

$$Z_T=\frac{P}{S_n}$$

wherein:

P is a polynomial in terms of even powers of angular frequency $\omega$,
$C_n$ is a trigonometric polynomial in terms of angular frequency $\omega$ and whose roots coincide with the first $n$ positive and negative roots of cos $\omega$,
$S_n$ is a trigonometric polynomial in terms of angular frequency $\omega$ with a root at zero and whose non-zero roots coincide with the first $n$ positive and negative non-zero roots of sin $\omega$, and
$n$ is an integer.

7. A network in accordance with claim 6, wherein the driving point impedance is defined by the expression:

$$\frac{C_n\left[\frac{\omega^2-\omega_o^2}{\omega}\right]}{S_n\left[\frac{\omega^2-\omega_o^2}{\omega}\right]}$$

and the open circuit transfer circuit impedance is defined by the expression:

$$\frac{P\left[\frac{\omega^2-\omega_o^2}{\omega}\right]}{S_n\left[\frac{\omega^2-\omega_o^2}{\omega}\right]}$$

and wherein $\omega_0$ is a fixed angular frequency.

8. A four terminal network for transmitting a limited range of signal frequencies comprising a plurality of interconnected substantially non-dissipative elements having an amplitude and phase response the square of whose magnitude is defined by the expression:

$$\frac{P'^2_{n-1}}{P'^2_{n-1}-\left(1-\frac{\omega^2}{\alpha^2}\right)B^2_{en}+C^2_n}$$

wherein:

$P'_{n-1}$ is a polynomial in terms of angular frequency $\omega$,
$\omega$ is the angular frequency,
$\alpha$ is a real numerical parameter,
$B_{en}$ is a polynominal in terms of even powers of angular frequency $\omega$,
$C_n$ is a trigonometric polynomial in terms of angular frequency $\omega$ and whose roots coincide with the first $n$ positive and negative roots of cos $\omega$, and
$n$ is an integer.

9. A four terminal network for transmitting a limited range of signal frequencies comprising a plurality of interconnected substantially non-dissipative elements having an amplitude and phase response the square of whose magnitude is defined by the expression:

$$\frac{P^2_{n-1}}{P^2_{n-1}-\left(1-\frac{\omega^2}{\alpha^2}\right)B^2_{on}+S^2_n}$$

wherein:

$P_{n-1}$ is a polynomial in terms of angular frequency $\omega$,
$\omega$ is the angular frequency,
$\alpha$ is a real numerical parameter,
$B_{on}$ is a polynomial in terms of odd powers of angular frequency $\omega$,
$S_n$ is a trigonometric polynomial in terms of angular frequency $\omega$ with a root at zero and whose non-zero roots coincide with the first $n$ positive and negative non-zero roots of sin $\omega$, and
$n$ is an integer.

10. A network representing the synthesis of the following polynomial expression for the amplitude and phase response of the network:

$$\frac{P(\omega)}{C_n(\omega)+jS_n(\omega)}$$

wherein:

P is a polynomial in terms of $\omega$,
$\omega$ is the angular frequency,
$C_n$ is a trigonometric polymonial in terms of angular frequency $\omega$ and whose roots coincide with the first $n$ positive and negative roots of cos $\omega$,
$S_n$ is a trigonometric polynomial in terms of angular frequency $\omega$ and whose non-zero roots coincide with the first $n$ positive and negative non-zero roots of sin $\omega$, and
$n$ is an integer.

11. A wave transmission network having an amplitude and phase response which is the multiplication product of a plurality of network responses, each of said network responses being defined by the expression:

$$\frac{P}{C_n+jS_n}$$

wherein:

P is a polynomial expressed in terms of angular frequency $\omega$,
$C_n$ is a trigonometric polynomial in terms of angular frequency $\omega$ and whose roots coincide with the first $n$ positive and negative roots of cos $\omega$,
$S_n$ is a trigonometric polynomial in terms of angular frequency $\omega$ with a root at zero and whose non-zero roots coincide with the first $n$ positive and negative non-zero roots of sin $\omega$, and
$n$ is an integer.

12. A network having a pair of input terminals and a pair of output terminals, for electrical wave transmission of a finite range of wave frequencies, said network comprising interconnected reactance elements, a load resistor connected across said pair of output terminals, said input terminals providing means for connecting a source of input voltage thereto, said source having a predetermined internal resistance, said reactances having such values that the network has a linear phase characteristic, said characteristic being established by the phase angle between input and output voltages taking on incremental values of $$\frac{\pi}{2}$$

radians throughout said range of wave frequencies; said reactances further providing that the open circuit driving point impedance at the output terminals has resonant and anti-resonant frequencies at uniformly spaced intervals, the highest of the resonant and anti-resonant frequencies being excepted, the excepted resonant and anti-resonant frequencies occurring at intervals so displaced from the uniformly spaced intervals that linearity of the phase characteristic is maintained throughout said range of wave frequencies.

13. A network having a pair of input terminals and a pair of output terminals for electrical wave transmission of a finite range of wave frequencies, said network comprising interconnected reactance elements, a load resistor connected across said pair of output terminals, said input terminals providing means for connecting a source of input voltage thereto, said output terminals providing means to derive an output voltage across said load resistor, said reactances having such values that the phase angle between input and output voltages takes on incremental values of $$\frac{\pi}{2}$$

radians at substantially equally spaced intervals throughout said range of wave frequencies, and the input and output voltages have a ratio which assumes certain predetermined values throughout said range of wave frequencies, said network having an open circuit transfer impedance whose roots are determined by the expression:

$$C_n^2+\left(1-\frac{\omega^2}{\alpha^2}\right)B_{on}^2=0$$

wherein:

$C_n$ is a trigonometric polynominal in terms of frequency $\omega$ and whose roots coincide with the first $n$ positive and negative roots of cos $\omega$,
$\omega$ is the angular frequency
$\alpha$ is a real numerical parameter
$B_{on}$ is a polynomial in terms of odd powers of angular frequency $\omega$, and
$n$ is an integer.

14. A network according to claim 13 wherein said ratio has a substantially constant value throughout said range of wave frequencies.

References Cited in the file of this patent

UNITED STATES PATENTS

| | | |
|---|---|---|
| 1,828,454 | Bode | Oct. 20, 1931 |
| 2,054,794 | Dietzold | Sept. 22, 1936 |

OTHER REFERENCES

Guillemin: Communication Networks, vol II, published in 1935 by John Wiley and Sons, New York, pp 184–198. (Copy in Scientific Library.)